United States Patent [19]

Underwood

[11] 4,441,729
[45] Apr. 10, 1984

[54] FOLDING BICYCLE

[75] Inventor: Herbert N. Underwood, Chicago, Ill.

[73] Assignee: Borg-Warner Corporation, Chicago, Ill.

[21] Appl. No.: 378,964

[22] Filed: May 17, 1982

[51] Int. Cl.³ .................................... B62F 15/00
[52] U.S. Cl. .................................. 280/278; 280/287
[58] Field of Search ............... 280/278, 287, 281 R; 74/551.3, 551.4, 551.7, 594.7; 297/195

[56] References Cited

U.S. PATENT DOCUMENTS

| | | | |
|---|---|---|---|
| 378,253 | 2/1888 | Latta | 280/278 |
| 413,414 | 10/1889 | O'Brien | 280/278 |
| 1,584,314 | 5/1926 | Mamiya | 280/278 |
| 1,584,568 | 5/1926 | Clark | 280/278 |
| 3,015,498 | 1/1962 | Tanaka et al. | 280/278 |
| 3,427,043 | 2/1969 | Oskam et al. | 280/278 |
| 3,493,241 | 2/1970 | Hermsdorfer | 280/278 |
| 3,512,816 | 5/1970 | Katano | 287/99 |
| 3,623,749 | 11/1971 | Jensen | 280/278 |
| 3,814,462 | 6/1974 | Kelly | 280/287 |
| 3,854,755 | 12/1974 | Tang | 280/278 |
| 3,863,521 | 2/1975 | Gatsos et al. | 280/278 |
| 3,876,231 | 4/1975 | Geisel | 280/278 |
| 3,993,322 | 11/1976 | Van Tijen | 280/278 |
| 4,002,351 | 1/1977 | Zuck | 280/278 |

FOREIGN PATENT DOCUMENTS

| | | | |
|---|---|---|---|
| 805350 | 5/1951 | Fed. Rep. of Germany | 280/278 |
| 665833 | 7/1964 | Italy | 280/287 |

Primary Examiner—Joseph F. Peters, Jr.
Assistant Examiner—Donn McGiehan
Attorney, Agent, or Firm—Florian S. Gregorczyk

[57] ABSTRACT

A folding bicycle assembly generally having a front and rear subassembly which pivot about a sprocket hub to nest with each other to provide a compact assembly for storage or transfer. The bicycle assembly utilizes wheels of a standard size and is equipped with pedals and handle bars that fold to further minimize the size of the folded assembly.

4 Claims, 7 Drawing Figures

FOLDING BICYCLE

BACKGROUND OF THE INVENTION

1. Field of the Invention

The present invention relates generally to folding bicycles and more particularly, bicycles with "standard" size wheels and height. It has been found desirable to provide a bicycle that can be easily and quickly folded into a compact package for storage and shipment. Further, such an assembly should provide means to eliminate the protruding handle bar and pedal assemblies without requiring complete disassembly of the bicycle.

2. Description of the Prior Art

In the prior art, various configurations have been proposed in an attempt to provide a compact bicycle assembly for storage. Broadly speaking, these prior art devices involve providing an awkward appearing assembly that has disproportionately sized wheels, a frame that provides an extra breakaway segment or an added frame segment providing a pivot point away from the driving or sprocket means. The aesthetic effect upon the user of a bicycle with an unusual appearance such as disproportionate tire sizes as illustrated in U.S. Pat. Nos. 1,584,568 and 3,623,749 is considered to be a detriment. In addition, it is more difficult to pedal and ride a bicycle with the smaller wheels illustrated in U.S. Pat. No. 3,623,749 to Jensen. Bicycles wherein the various frame segments are of a breakaway type are shown in at least the following U.S. Pat. Nos.: 1,584,314 (Mamiya); 3,854,755 (Tang); 3,876,321 (Geisel); and 3,993,322 (Van Tijen). In each of these devices a frame element is provided which breaks away or in the case of Tang U.S. Pat. No. 3,854,755 requires complete disassembly. The extra-element devices are clearly shown in U.S. Pat. Nos. 3,015,498 (Tanaka et al.), 3,512,816 (Katano) and 4,002,351 (Zuck). In Tanaka et al. U.S. Pat. No. 3,015,498 there are provided added hub and seat support pivots; Katano U.S. Pat. No. 3,512,816 at FIG. 1 illustrates a connecting joint at C between tubes $l_1 b_1$ and $a_2 b_2$; and Zuck U.S. Pat. No. 4,002,351 illustrates dual pivots at the extremities of seat support vertical tube 12.

The present invention is directed to improvements in a folding bicycle assembly, especially for a standard size type bicycle. More particularly, the present invention contemplates a rear subassembly including a sprocket hub member and a front subassembly connected to said sprocket hub member and pivotable thereabout to provide a compact assembly for storage and/or transportation. The bicycle assembly in its operative mode appears as a standard bicycle generally of the 26 to 28 inch size, and is operable with a standard bicycle transmission system. The assembly may be equipped with folding handle bars and folding pedals to minimize protrusions in its folded or storage mode, and the bicycle body seat support member can be equipped with means to provide adjustable height positions. In its stored condition, the folding bicycle herein has the front wheel removed therefrom and affixed to the folded bicycle.

BRIEF DESCRIPTION OF THE DRAWINGS

In the Figures of the drawings, like reference numerals identify like components, and in those drawings.

DESCRIPTION OF THE PREFERRED EMBODIMENT

Figure 1:
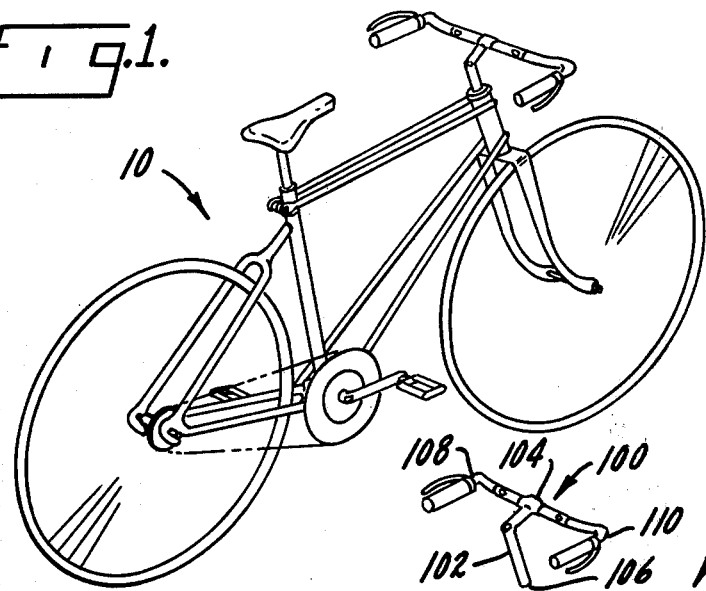
FIG. 1 is a perspective view of the bicycle of the present invention in the assembled mode.

Referring now in more detail to the drawings, FIG. 1 shows a folding bicycle assembly 10 in its assembled, operable state. Bicycle 10 is a conventional bicycle assembly utilizing standard tire sizes for an adult bicycle, that is, about 26 to 28 inches in diameter.

Figure 2:
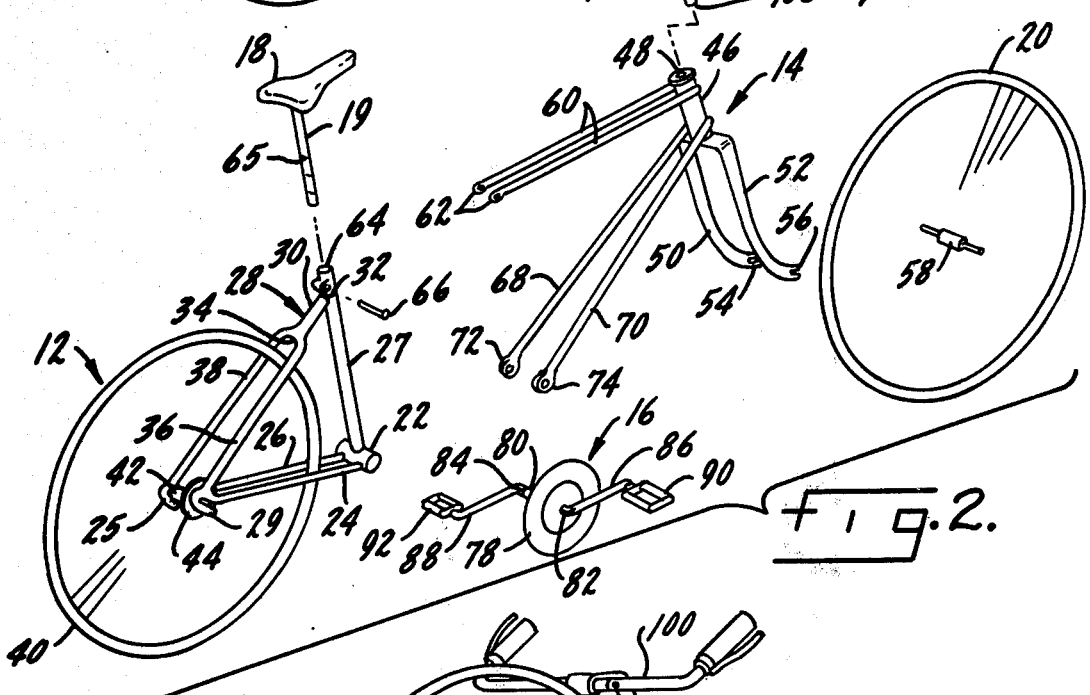
FIG. 2 is an exploded perspective view of the bicycle of the present invention.

In FIG. 2, bicycle 10 is shown in an exploded side view including rear subassembly 12, front subassembly 14, sprocket axle and pedal subassembly 16, seat 18 and stem support 19, and front wheel 20.

Rear subassembly 12 includes a frame segment with hollow cylindrical sprocket hub 22, an upright vertical tubular member 27 affixed to and extending from sprocket hub 22 in a generally vertical direction, and a pair of parallel rear wheel supports 24, 26 affixed to and extending from sprocket hub 22 at substantially right angles relative to upright tube member 27 and terminating in rear wheel axle receiving means 25 and 29. Rear subassembly 12 includes a yoke 28 having a bar member 30 with a first end 32 affixed to vertical member 27 near the upper end of member 27. Yoke 28 at its other end 34 diverges into parallel side bars 36, 38, which bars also terminate in rear wheel axle receiving means 25 and 29. Rear wheel axle receiving means 25 and 29 is shown as a common termination member for parallel rear wheel supports 24, 26 and parallel side bars 36, 38 of yoke 28. However, this termination member 25 or 29 may be of any type known in the prior art, or the termination means of supports 24, 26 and side bars 36, 38 may be independent, thereby to receive and retain a rear wheel axle in a bicycle assembly. Rear subassembly 12 includes a rear wheel 40 which has an axle member 42 mountable in rear wheel receiving means 25 and 29 as known in the art. Axle member 42 supports a chain drive means 44 and a transmission means (not shown) as known in the art.

Front subassembly 14 includes a fork hub member 46, which defines a bore 48, a pair of parallel fork legs 50, 52 extending downward from hub member 46 and terminating in axle retaining means 54, 56 respectively. Front wheel 20 has an axle 58 for positioning in axle retaining means 54, 56. Subassembly 14 further includes at least two horizontal support means 60, affixed to and extending rearwardly from hub member 46 at substantially right angles to fork members 50, 52, and having an end 62 to mate with retaining means 64 for receiving a holding pin 66, thus assisting (when assembled) to secure the front and rear subassemblies 12 and 14 and also serving as a means to adjust the height of seat 18. Stem support 19 defines a plurality of scallops or indents 65 equispaced along its length and engageable by pin 66 to secure stem 19 at a fixed height to thereby provide the seat height adjustment. Front subassembly 14 further incorporates a pair of angular support members 68, 70, affixed to and extending from hub member 46 at an angle intermediate horizontal support member 60 and fork legs 50, 52. Angular support members 68, 70 at their terminations define annular bearing means 72, 74, respectively.

Figure 5:
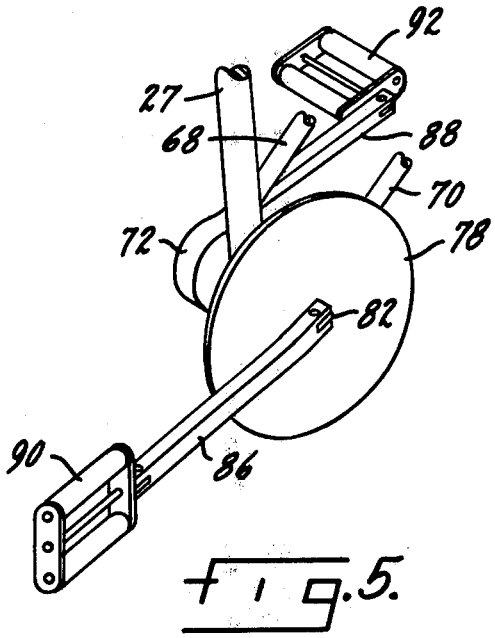
FIG. 5 is an enlarged perspective view of the sprocket, sprocket hub and pedal assembly illustrating both the operative and storage modes for the pedals.
Figure 6:
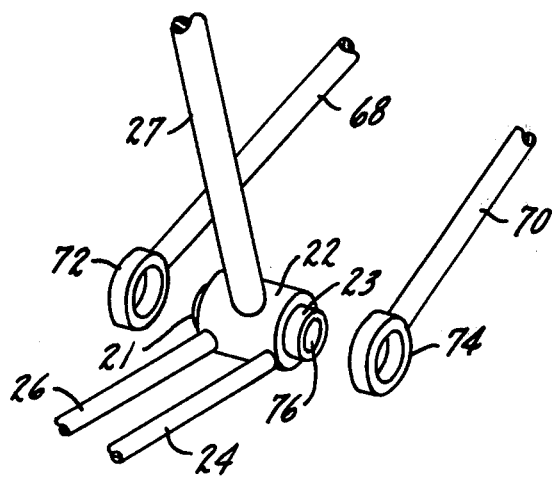
FIG. 6 is an enlarged, exploded perspective view of the sprocket hub construction.

Front subassembly 14 and rear subassembly 12 are permanently coupled at cylindrical sprocket hub 22 which defines annular bearing end portions 21 and 23 for receiving annular bearing surfaces 72, 74 as illustrated in FIG. 6, enabling surfaces 72, 74 to rotate about bearing end portions 21, 23. Sprocket hub 22 defines a cavity 76. Sprocket axle and pedal subassembly 16 as shown in FIG. 2, includes toothed sprocket gear or gears 78, sprocket axle 80 having a first end 82 and a second end 84, and a pair of crank arms 86, 88 supporting pedals 90, 92 respectively. Crank arms 86, 88 each define a pedal-receiving end wherein pedals 90 and 92 are mounted, as also illustrated in FIG. 5. Sprocket axle 80 is positioned in cavity 76 and its ends 82, 84 protrude therefrom. Sprocket gear or gears 78 are mounted on sprocket axle first end 82, and crank arm 86 is then affixed to the same end 82 at its extremity further from its pedal 90. Similarly, crank arm 88 is mounted on sprocket axle second end 84 but in a direction such that the pedals are 180° apart if considered to be in the same plane, as known in the prior art. Pedals 90 and 92 are equipped with pin and socket means as known in the art to afford swiveling the pedals in a plane parallel to the plane of rear wheel 40, as illustrated in FIG. 5 by pedal 90.

Figure 4A:
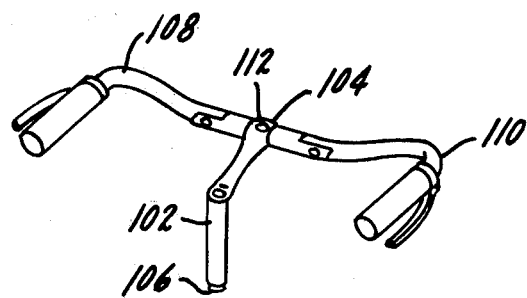
FIGS. 4A and 4B are perspective views illustrating the handle bars in the operative and folded modes, respectively.
Figure 4B:
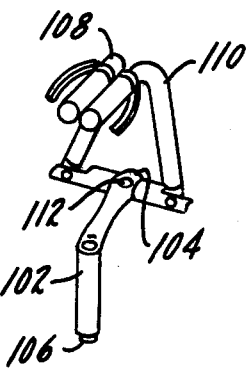

Bicycle 10 includes handle bars means 100 as shown in FIGS. 2, 4A and 4B, as known in the prior art, of a generally tee-shaped with a leg 102 defining a top end 104 and a bore end 106. Handle bar means 100 has arms 108 and 110 extending in opposite directions from top end 104 of handle bar leg 102. Leg 102 is insertable in bore 48 of fork member 46. In FIGS. 4A and 4B handle bar means 100 is illustrated in two modes. In its operable mode, FIG. 4A, the arms extend in opposite directions from the top end 104 of leg 102. In the transfer or storage mode, FIG. 4B, arm 108 and 110 are pivoted vertically 90° from the operable mode and are parallel with one another. In this storage mode, arms 108 and 110 provide a more compact folded bicycle assembly. Arms 108 and 110 are retained in the operable position by securing means 112 as known in the prior art. Securing means 112 can be a pin, screw or other holding means known in the art.

Figure 3:
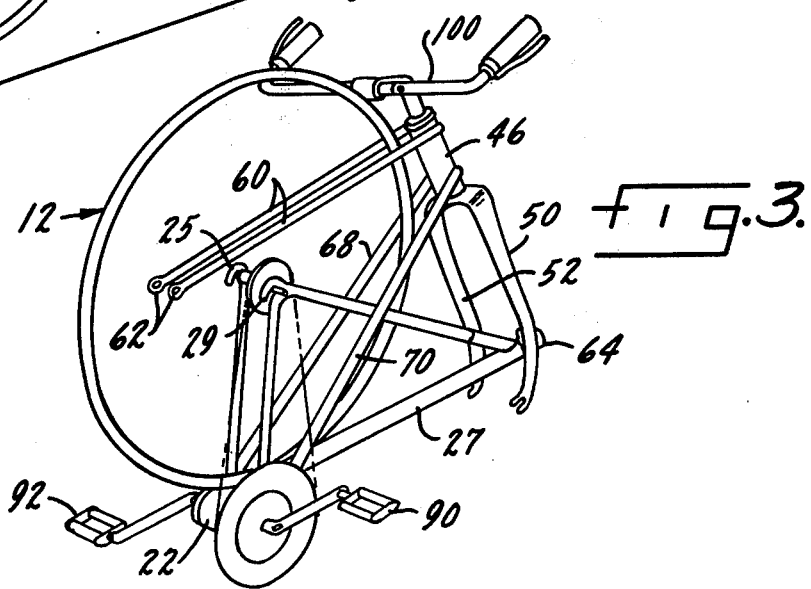
FIG. 3 is a perspective view of the bicycle in its storage mode, but with the handle bars and pedals extended.

FIG. 3 illustrates the bicycle of the present invention in its folded or storage mode. In this mode, front wheel 20 has been removed for storage adjacent to the rear wheel 40. Thereafter, handle bar means 100 and fork hub member 46 are turned 180°, and fork legs 50, 52 are positioned on either side of vertical tubular member 27. Pin 66 was disengaged from retaining means 64 to allow removal of seat 18 and tubular support 19, as well as disengaging front subassembly 14 horizontal support means 60 from vertical member 27 of rear subassembly 12. Rear subassembly 12 and front subassembly 14 are relatively pivotable about sprocket hub 22, annular bearings 21, 23 and annular bearing surfaces 72, 74 shown in FIG. 6 to nestingly engage each other, wherein rear subassembly 12 is in register between angular support members 68, 70 and fork members 52, 50. Thereafter, front wheel 20 is affixed to the nested assembly and vertical support member 27 is secured in a position essentially perpendicular to fork members 52, 50. As shown in FIGS. 4B and 5, handle bar means 100 and pedal means 90, 92 are pivoted to the storage position, providing a compact package of a full size bicycle for storage in case of transfer. In addition, handle bar means 100 in this storage position serves as a convenient carrying means for the folded bicycle.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A folding bicycle assembly, comprising:
    a rear subassembly including a hollow cylindrical sprocket hub having first and second annular bearing end portions, an upright tubular support member extending from said sprocket hub, a pair of rear wheel axle supports extending from said sprocket hub at substantially right angles relative to the upright support, and a yoke member, having a first end affixed to said upright support end including a rear wheel axle receiving means at the ends of the rear wheel axle supports, a rear wheel, and a rear wheel axle extending through said rear wheel and fastened to the rear wheel axle receiving means to complete a rigid, generally triangular subassembly, and
    a front subassembly, including a fork hub member defining a bore, a pair of fork legs extending downwardly from said hub member terminating in axle retaining means to receive the axle for a front wheel, at least two horizontal support members extending rearwardly from the fork hub member at substantially right angles to the fork legs, and a pair of angular supports extending from the fork hub member at an angle intermediate the horizontal support member and the fork legs, said angular support members defining extremities terminating at annular bearing means which ride on the sprocket hub bearing end portions enabling relative rotation of the rear and front subassemblies to thus nest said subassemblies to provide a compact arrangement for storage.

2. A folding bicycle assembly as claimed in claim 1 wherein said assembly further comprises a body seat and a stem support therefor, which stem support includes scalloped segments therein to provide means of adjustment for said body seat when said stem support is mated with said upright tubular support member.

3. A folding bicycle assembly as claimed in claim 1 wherein said assembly further comprises a set of handle bars of a generally tee-shape including a leg segment and arms extending therefrom, which leg segment is mated to said bore of said fork hub member, and which handle bars have securing means to release said arms for parallel alignment with the plane of said rear wheel, and provide a carrying means for said bicycle assembly when folded.

4. A folding bicycle assembly as claimed in claim 1 wherein said assembly comprises a sprocket assembly having a sprocket gear means, a chain means, pedal and crank means and a sprocket hub axle means which sprocket axle is positioned in said sprocket hub and where said sprocket gear means is mounted on and retained on said sprocket hub axle and where said pedal means are disengageable to lie in a plane parallel to the plane defined by said rear wheel while being retained on said crank means.

* * * * *